United States Patent
Chaudhry et al.

(10) Patent No.: US 10,072,853 B2
(45) Date of Patent: Sep. 11, 2018

(54) WATER HEATER HAVING A SUPPLEMENTAL PHOTOVOLTAIC HEATING ARRANGEMENT

(71) Applicants: Raheel A. Chaudhry, Montgomery, AL (US); Arthur Y. Hinton, Pike Road, AL (US); Jozef Boros, Montgomery, AL (US)

(72) Inventors: Raheel A. Chaudhry, Montgomery, AL (US); Arthur Y. Hinton, Pike Road, AL (US); Jozef Boros, Montgomery, AL (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 114 days.

(21) Appl. No.: 14/986,871

(22) Filed: Jan. 4, 2016

(65) Prior Publication Data

US 2016/0195284 A1 Jul. 7, 2016

Related U.S. Application Data

(60) Provisional application No. 62/099,529, filed on Jan. 4, 2015.

(51) Int. Cl.
*F24H 1/18* (2006.01)
*F24D 19/10* (2006.01)
(Continued)

(52) U.S. Cl.
CPC ......... *F24D 19/1075* (2013.01); *F24D 3/005* (2013.01); *F24D 17/0021* (2013.01);
(Continued)

(58) Field of Classification Search
None
See application file for complete search history.

(56) References Cited

U.S. PATENT DOCUMENTS 3,324,280 A 6/1967 Cheney et al.
4,345,583 A 8/1982 Morin
(Continued)

OTHER PUBLICATIONS

Solar Converter PPT 12/24 7A Linear Pump Current Booster, retrieved from Clean Energy Brands: http://www.cleanenergybrands.com/shoppingcart/products/Solar-Converter-PPT, Dec. 28, 2014.
(Continued)

*Primary Examiner* — Thor Campbell
(74) *Attorney, Agent, or Firm* — King & Spalding LLP

(57) ABSTRACT

A water heater is provided having an insulated tank having a water inlet and a water outlet, and further defining an interior volume to contain a quantity of water. A primary heating arrangement applies heat energy to the water so as to heat the water. In addition, the primary heating arrangement is configured to maintain the water during standby periods between upper and lower set point temperatures. A supplemental heating arrangement is operative to supply additional heat energy to the water in order to lessen energy usage by the primary heating arrangement during the standby periods. In accordance with a preferred embodiment, the supplemental heating arrangement includes at least one photovoltaic panel and a supplemental heating element. Control electronics are operatively interposed between the at least one photovoltaic panel and the supplemental heating element.

25 Claims, 5 Drawing Sheets

(51) Int. Cl.
*F24D 3/00* (2006.01)
*F24D 17/00* (2006.01)
*F24H 1/20* (2006.01)
*F24H 9/20* (2006.01)

(52) U.S. Cl.
CPC ..... *F24D 17/0031* (2013.01); *F24D 19/1069* (2013.01); *F24D 19/1081* (2013.01); *F24H 1/202* (2013.01); *F24H 9/2021* (2013.01); *F24D 2200/02* (2013.01); *F24D 2200/08* (2013.01); *F24H 2240/09* (2013.01); *Y02B 10/20* (2013.01); *Y02B 10/70* (2013.01)

(56) References Cited

U.S. PATENT DOCUMENTS

| | | | |
|---|---|---|---|
| 5,293,447 A * | 3/1994 | Fanney | F24D 19/1057 136/248 |
| 5,668,922 A | 9/1997 | Ross et al. | |
| 6,240,249 B1 | 5/2001 | Henderson et al. | |
| 6,242,720 B1 | 6/2001 | Wilson et al. | |
| 6,363,218 B1 * | 3/2002 | Lowenstein | H05B 1/0283 392/498 |
| 6,785,466 B1 | 8/2004 | Jackson et al. | |
| 7,506,616 B2 | 3/2009 | Calvert | |
| 8,220,453 B2 | 7/2012 | Bourke | |
| 8,813,687 B2 | 8/2014 | Chaudhry | |
| 8,897,632 B2 * | 11/2014 | Flohr | F24H 9/2021 392/441 |
| 8,909,033 B2 * | 12/2014 | Kreutzman | F24D 19/1048 219/482 |
| 8,977,117 B2 * | 3/2015 | Kreutzman | H05B 3/82 29/890.031 |
| 2009/0188486 A1 * | 7/2009 | Thomasson | F24D 17/0021 126/585 |
| 2009/0214195 A1 * | 8/2009 | Thomasson | F24D 11/003 392/451 |
| 2013/0266296 A1 * | 10/2013 | Kreutzman | F24D 19/1048 392/308 |
| 2013/0266300 A1 * | 10/2013 | Kreutzman | H05B 3/82 392/501 |
| 2014/0112647 A1 * | 4/2014 | Lichtenberger | F24H 1/202 392/308 |
| 2014/0153913 A1 * | 6/2014 | Newman | F24D 19/1057 392/451 |

OTHER PUBLICATIONS

Manual Model: PPT 12/24-7V, retrieved from Solar Converters Inc., revision D, Dec. 28, 2014.

* cited by examiner

WATER HEATER HAVING A SUPPLEMENTAL PHOTOVOLTAIC HEATING ARRANGEMENT

CLAIM OF PRIORITY

This application claims priority to U.S. Provisional Application No. 62/099,529, filed Jan. 4, 2015, the entire disclosure of which is incorporated by reference herein.

BACKGROUND OF THE INVENTION

The present invention relates generally to water heaters. More particularly, the present invention relates to a water heater in which a primary heating arrangement (e.g., electric or gas) is supplemented by a photovoltaic heating arrangement.

Typical water heaters have a tank in which a quantity of heated water is maintained for use as needed. Generally speaking, such water heaters fall into one of two categories, i.e., electric or gas, depending on the type of heat source used to bring the water in the tank up to the desired temperature. Electric water heaters, for example, are often configured having two electric heating elements near the top and the bottom of the tank, respectively. Typically, the heating elements are energized by AC voltage (such as 240 VAC or others) which is turned on and off as necessary to maintain the desired temperature.

In this regard, electronic or bimetallic thermostats are used to regulate the water temperature by sensing the water temperature and allowing the voltage to be applied to the heating element(s) when heat is needed. Heat loss over a period of time (i.e., standby loss) or usage of the water heater capacity determines the demand for hot water. Thus, tanks that exhibit greater heat loss in the idle state are less efficient than those that exhibit less standby heat loss because more electric (or gas) energy is required to maintain the desired temperature. Efforts have thus been made to increase efficiency by providing better insulation for the tank. However, even very well insulated water heaters experience some standby loss.

The present invention recognizes the foregoing considerations, and others, of the prior art.

SUMMARY OF THE INVENTION

According to one aspect, the present invention provides a water heater comprising an insulated tank having a water inlet and a water outlet, and further defining an interior volume to contain a quantity of water. A primary heating arrangement applies heat energy to the water so as to heat the water. In addition, the primary heating arrangement is configured to maintain the water during standby periods between upper and lower set point temperatures.

A supplemental heating arrangement, operative to supply additional heat energy to the water in order to lessen energy usage by the primary heating arrangement during the standby periods, is also provided. In accordance with a preferred embodiment, the supplemental heating arrangement includes at least one photovoltaic panel and a supplemental heating element. Control electronics are operatively interposed between the at least one photovoltaic panel and the supplemental heating element.

In many cases, the primary heating arrangement may comprise at least one primary heating element adapted to be energized by AC power. For example, the primary heating arrangement may comprise first and second heating elements located near the top and bottom of the tank, respectively. Typically, first and second thermostats will be respectively associated with the first and second heating elements. For example, the thermostats may comprise bimetallic thermostats or thermistors depending on the embodiment. According to some embodiments, the primary heating arrangement may comprise an electronic processor-based control system operative to control individually the first and second heating elements. In addition, the control system can operate the supplemental heating arrangement in response to tank conditions. The control electronics of the supplemental heating arrangement may comprise a maximum power point tracking (MPPT) controller.

According to an exemplary embodiment, the second heating element may comprise a primary resistive element and the supplemental heating element. The supplemental heating arrangement may further comprise a high temperature limit switch operative to disconnect application of photovoltaic energy if a predetermined threshold temperature is reached.

Another aspect of the present invention provides a water heater comprising a tank defining an interior volume to contain a quantity of water. A primary heating arrangement, comprising at least one primary resistive element energized by AC power, applies heat energy to the water so as to heat the water. In this case, the primary heating arrangement further includes at least one thermostat to detect water temperature.

The water heater also has a supplemental heating arrangement operative to supply additional heat energy to the water in order to lessen energy usage by the primary heating arrangement. The supplemental heating arrangement includes at least one photovoltaic panel, a supplemental heating element, and control electronics operatively interposed between the at least one photovoltaic panel and the supplemental heating element. A main controller is in electrical communication with the primary heating arrangement and the control electronics of the supplemental heating arrangement so as to control selectively heating at the at least one primary resistive element and the supplemental heating element.

In some embodiments, the control electronics of the supplemental heating arrangement are contained in a separate housing from the main controller. Embodiments are also contemplated wherein the control electronics of the supplemental heating arrangement are integrated into the main controller.

An additional aspect of the present invention provides a method of controlling operation of a water heater having a primary heating arrangement that functions to maintain water temperature during standby periods between a predetermined upper set point temperature and a predetermined lower set point temperature. One step of the method involves providing a solar heating arrangement operative to supply additional heat energy to the water in order to lessen energy usage by the primary heating arrangement, the solar heating arrangement including electronics operative to detect availability of solar energy. According to another step, a determination is made of whether abundance of solar energy at a particular time exceeds a threshold. If the abundance of solar energy exceeds the threshold, raising at least the lower set point temperature. According to a further step, heat energy from the solar heating arrangement is applied to water contained within the water heater if the water temperature is between the upper set point temperature and the lower set point temperature.

According to exemplary methodology, the primary heating arrangement may be temporarily disabled when heat energy from the solar heating arrangement is applied. In some cases, the primary heating arrangement may be operated to apply heat energy when additional heat energy from the solar heating arrangement is also applied. Exemplary methodology contemplates determining whether one of the upper set point temperature and lower set point temperature has already been raised if the abundance of solar energy does not exceed the threshold. If one of the upper set point temperature and lower set point temperature has already been raised, it can be lowered to a default value.

Another aspect of the present invention provides a method of controlling operation of a water heater having a primary heating arrangement. According to one step, a solar heating arrangement operative to supply additional heat energy to the water in order to lessen energy usage by the primary heating arrangement is provided. A determination is made of whether solar energy is available at a particular time. If the solar energy is available, heat energy is applied from the solar heating arrangement to water contained within the water heater. While heat energy is being applied from the solar heating arrangement, the primary heating arrangement is selectively operated to also supply heat energy to the water.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
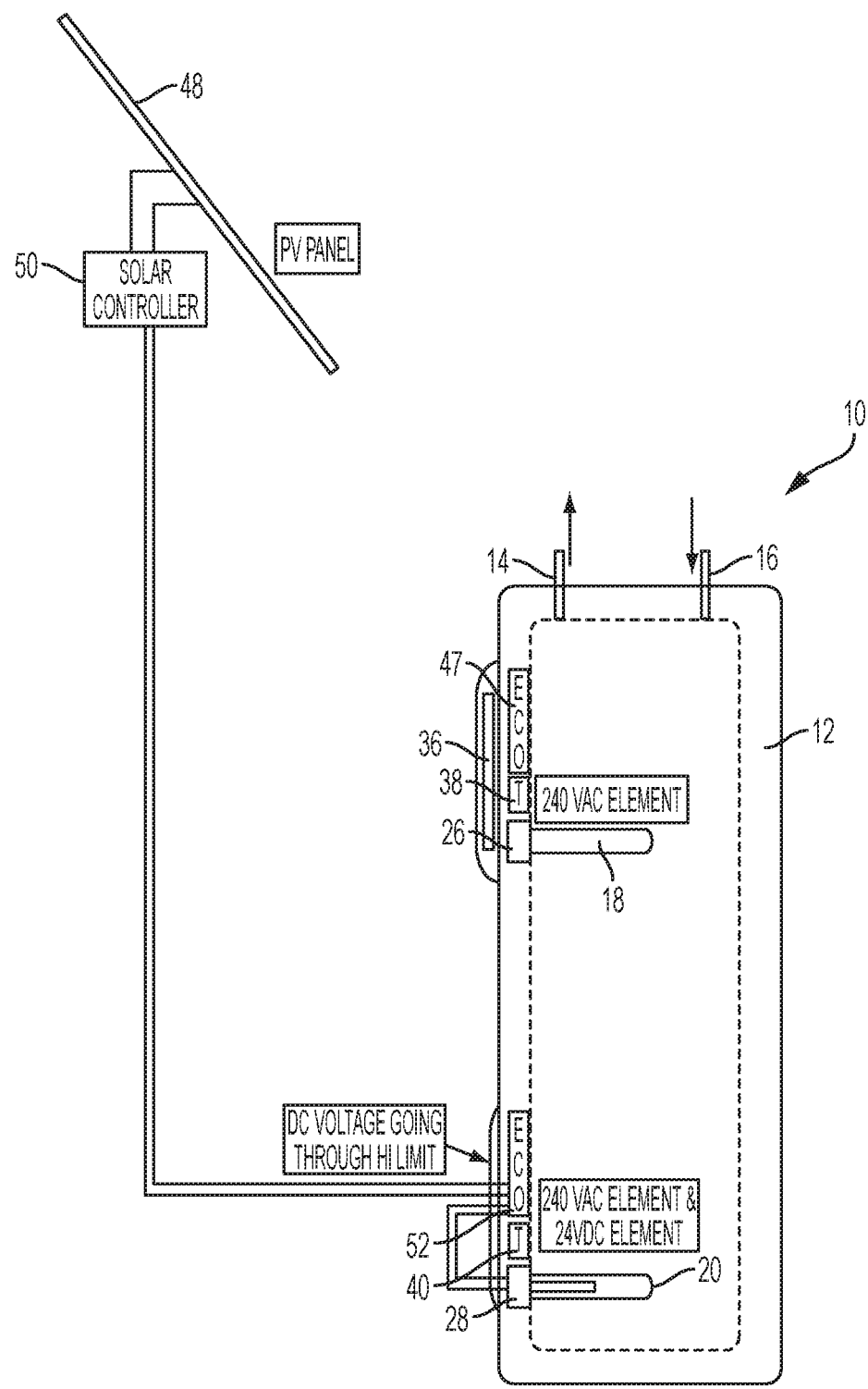
FIG. 1 is a diagrammatic representation of a water heater constructed in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Presently-described embodiments provide a water heater having a supplemental photovoltaic (e.g., solar) heating arrangement which at least partially offsets standby losses that might otherwise occur. The energy produced by one or more relatively small and easily-installable photovoltaic panels preferably contributes energy equal to or greater than typical standby loss. Because modern water heaters are generally well-insulated, this can often be achieved by a solar energy contribution which is less than about 5% of the water heater's total energy consumption. Water heaters constructed in accordance with the present invention may often achieve an Energy Factor (EF) of greater than 1.0.

Referring now to FIG. 1, a water heater 10 constructed in accordance with an embodiment of the present invention is illustrated. Water heater 10 includes an insulated tank 12 capable of containing a fixed volume of water, e.g., 20, 40, or 50 gallons. Heated water is discharged through an outlet 14, while colder water enters the tank through an inlet 16. Often, inlet 16 will be configured such that the incoming water will enter and mix with the existing water near the bottom of the tank.

Figure 2:
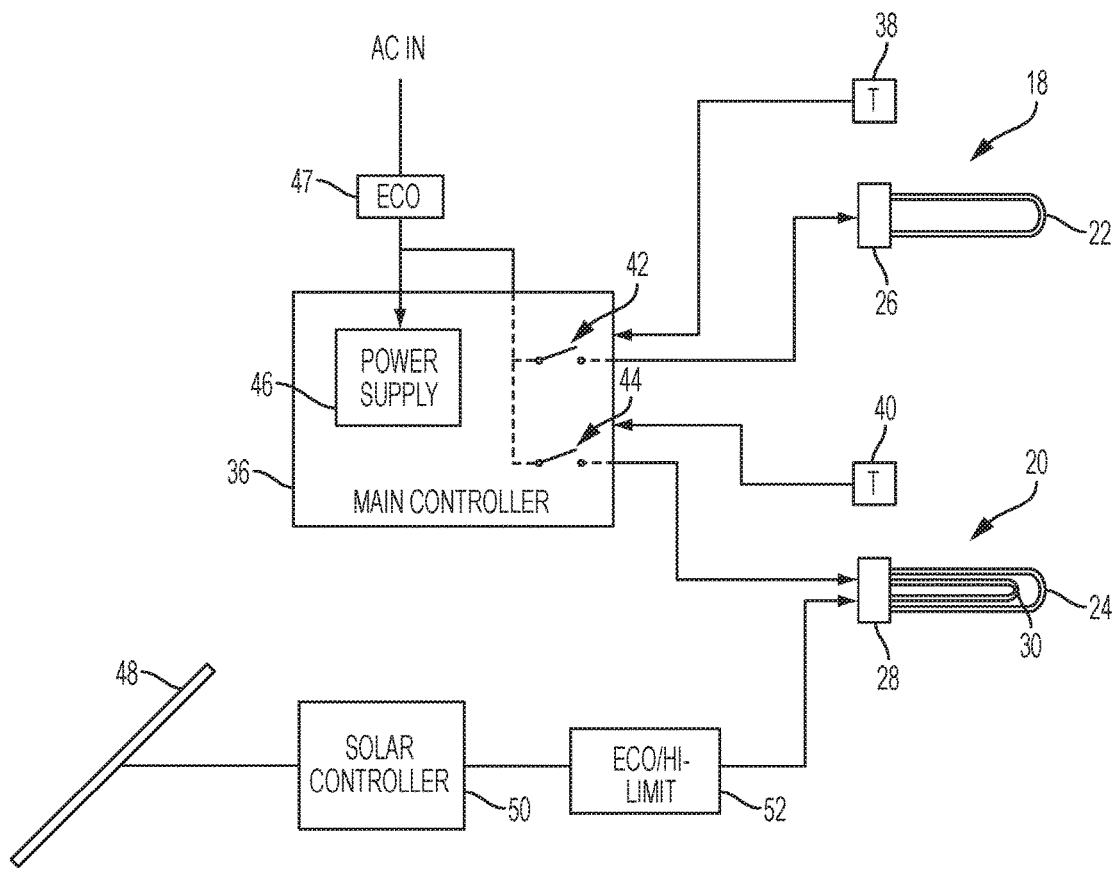
FIG. 2 is a block diagram showing certain aspects of the water heater of FIG. 1.

Referring now also to FIG. 2, water heater 10 includes top and bottom heating elements 18 and 20 mounted to the tank. In this regard, each of heating elements 18 and 20 includes a resistive element 22 and 24 that loops into the interior volume of the tank from a respective mounting flange 26 and 28. Application of AC energy (e.g., 240 VAC) to resistive elements 22 and 24 causes them to heat in conventional fashion. In this case, however, heating element 20 includes a supplemental resistive element 30 to which supplemental photovoltaic energy is applied to offset standby losses in the tank. (One skilled in the art will appreciate that FIG. 2 is a simplified block diagram in which electrical connections that may actually be two or more lines are shown as a single line.)

Figure 3:
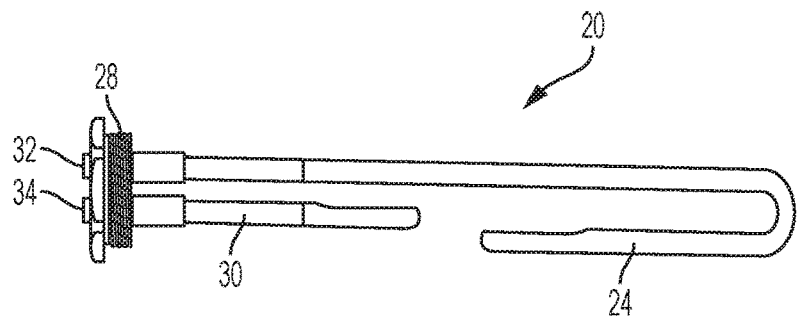
FIG. 3 is a side elevation of a dual-sheath heating element that can be used in accordance with embodiments of the present invention to allow primary electric heating and photovoltaic supplemental heating.

Additional detail regarding a preferred embodiment of heating element 20 can be seen in FIG. 3. As shown, resistive element 24 turns back in order to increase its overall length, and thus the heated surface area exposed to the water. In this embodiment, resistive element 30 has a shorter overall length because it is intended to supplement the heating provided by the primary AC heating arrangement. A pair of connection terminals, e.g., terminal 32, provides electrical connection between resistive element 24 and a source of AC energy. Likewise, a pair of connection terminals, e.g., terminal 34, provides electrical connection between resistive element 30 and the photovoltaic source.

Referring again to FIGS. 1 and 2, water heater 10 in this embodiment includes an electronic controller 36 that operates resistive elements 22 and 24. In this regard, respective electronic thermostats (e.g., thermistors) 38 and 40 detect the water temperature near heating elements 18 and 20. This temperature information is fed to controller 36 and used to selectively turn resistive elements 22 and 24 on and off. In particular, controller 36 operatives respective electrical switches 42 and 44 that connect or disconnect AC energy to resistive elements 22 and 24, respectively. Switches 42 and 44 may be any suitable type of normally open switching device that may be operated by controller 36, such as a suitable solid state or solenoid controlled switch. Controller 36 includes a DC power supply 46 also in electrical communication with the AC power source through an electrical cut-off (ECO) 47. As one skilled in the art will recognize, ECO 47 removes electrical power from the water heater in the event of an over-temperature condition. Typically, an ECO, once opened, must be manually reset.

Preferably, controller 36 includes a processor implementing instructions (e.g., firmware) that will turn on resistive elements 22 and 24 at different times in order to achieve the desired results. For example, if hot water in the tank has been used, controller 36 may first turn on resistive element 22 while leaving resistive element 24 off. This heats water near the top of the tank (where hot water discharges) so that some hot water is available more quickly. After the water at the top of the tank has been heated, resistive element 22 turns off and, depending on the temperature detected at thermostat 40, resistive element 24 may be turned on. When the desired temperature at the bottom of the tank is also reached, both of the AC resistive elements will be off. Without any supplemental heating as described herein, the tank temperature will gradually decrease due to escaping heat. Once the temperature drops by a predetermined amount (e.g, 15-20 degrees F.), resistive heating is again applied to bring the water temperature back up to target. If no water is used, this cycle of heating and slow cooling repeats in "saw tooth" fashion.

In accordance with the present invention, such standby losses can be at least partially offset using supplemental photovoltaic energy. Specifically, the illustrated embodiment utilizes one or more photovoltaic panel(s) 48 mounted at a suitable location for exposure to solar energy. For example, photovoltaic (PV) panel 48 may be placed on a homeowner's roof in an orientation likely to receive the most energy from the sun. The energy yielded by photovoltaic (PV) panel 48 is preferably conditioned using a suitable solar controller 50 for application to resistive element 30. According to a preferred embodiment, for example, controller 30 may be a maximum power point tracking (MPPT) controller. Such controllers operate as DC-to-DC converters to optimize matching between PV panel 48 and the resistive load. Although solar controller 50 is shown as a separate device in the drawing, one skilled in the art will appreciate that it can be integrated into PV panel 48.

In this embodiment, the supplemental solar heating arrangement operates independently of controller 36. Thus, the additional heat provided by resistive element 30 will not be dictated by controller 36, but will reduce the need in standby for controller 36 to turn on resistive elements 22 and 24. In order to ensure that PV panel 48 does not overheat the water, a high temperature limit switch 52 is provided. Switch 52 is normally closed, but will open in the event that the water temperature reaches a predetermined threshold. For example, switch 52 may be a bimetallic switch, attached to tank 12 at a suitable location, that opens mechanically when the temperature threshold is reached. In this embodiment, switch 52 is configured as an ECO which must be manually reset once tripped.

As an example, panel 48 may generate up to 235 W of power with good exposure to sunlight. In this case, controller 50 can operate to provide 8-10 amps of DC current at a nominal 24 VDC. One commercially available solar controller believed to be suitable for this purpose is the PPT 12/24 solar controller from Solar Converters Inc., located in Guelph, Ontario, Canada. As available, the supplemental energy is supplied continuously to tank 12 subject to being cut-off if high-limit switch 52 detects excessive temperature.

Figure 4:
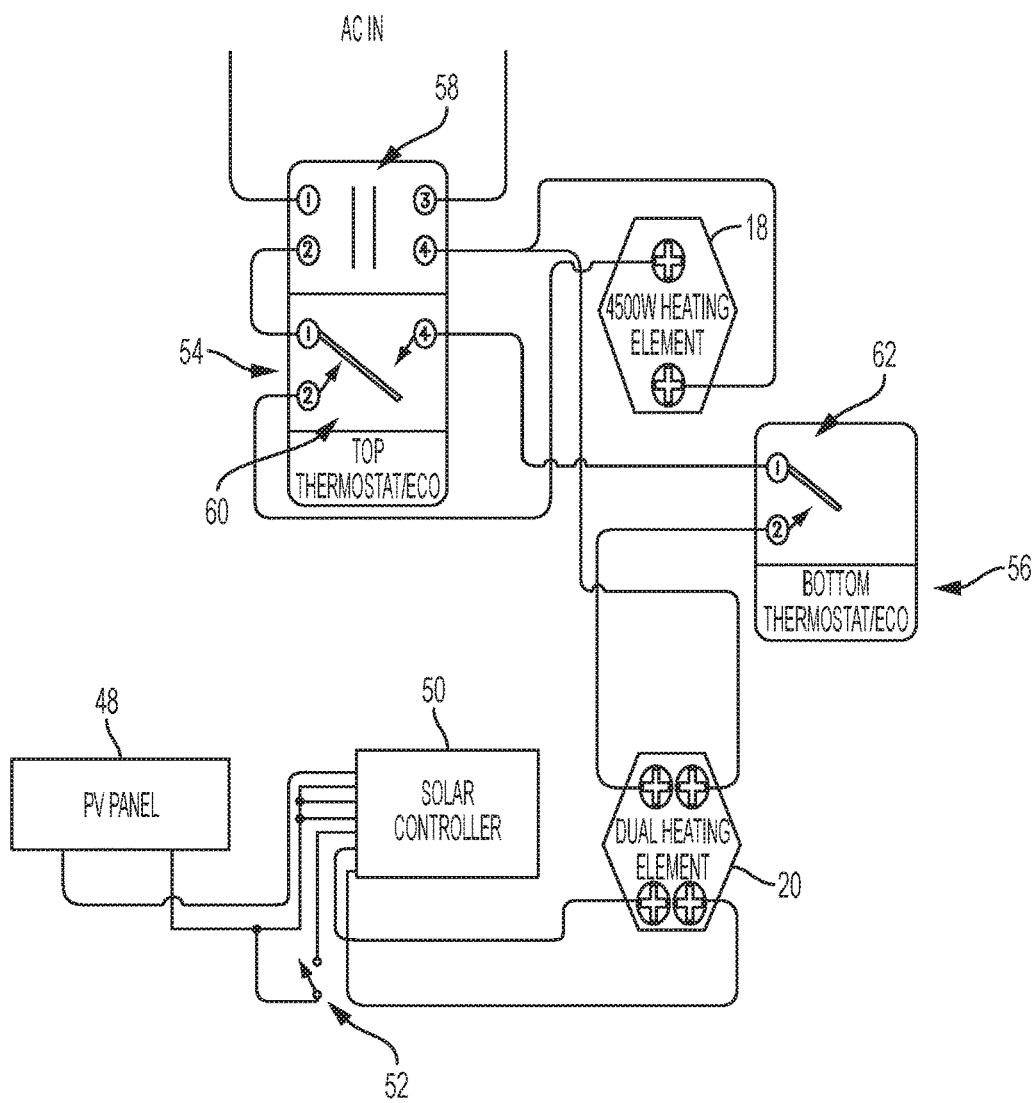
FIG. 4 is a diagrammatic representation of a heating arrangement in accordance with a first alternative embodiment of the present invention.

Referring now to FIG. 4, a supplemental heating arrangement similar to that shown in FIGS. 1 and 2 is incorporated into a water heater utilizing traditional bimetallic thermostats. In this regard, the thermostat for top heating element 18 is incorporated into a first switching unit 54 which includes the ECO for the AC power connection. The thermostat for the AC portion of bottom heating element 20 is incorporated into a second switching unit 56. The respective temperature set points of the top and bottom thermostats, and the manner in which switching units 54 and 56 are interconnected, achieve the desired operation.

In this regard, AC energy enters first switching unit 54 through a normally closed high-limit switch 58. The state of the top thermostat determines whether the switch 60 connects between terminals "1" and "4," or between terminals "1" and "2." If the switch position is between terminals "1" and "2," then heating element 18 is energized. If the switch position is between terminals "1" and "4," heating element 18 is not energized but energy is provided to second switching unit 56. The state of the bottom thermostat determines whether switch 62 of second switching unit 56 is in an open or closed position. If switch 62 is in the closed position, then resistive element 24 of heating element 20 is energized.

As shown, solar controller 50 supplies energy to supplemental element 30 of heating element 20 on a continuous basis as solar energy is available. This is subject to high-limit switch 52, which cuts off the supply of solar energy if the water temperature reaches a threshold. FIG. 4 shows greater detail regarding the specific wiring pattern between PV panel 48 and solar controller 50 for the exemplary PPT 12/24 solar controller mentioned above. One skilled in the art will appreciate that the wiring pattern will likely change if a different solar controller is employed.

Embodiments are also contemplated in which the solar controller supplies information to and/or operates under the control of the main water heater controller in order to achieve improved results. In some such embodiments, for example, the functionality of the solar controller could be incorporated into the main controller. In other embodiments, a separate solar controller could be provided but it is in operative communication with the main controller.

Figure 5:
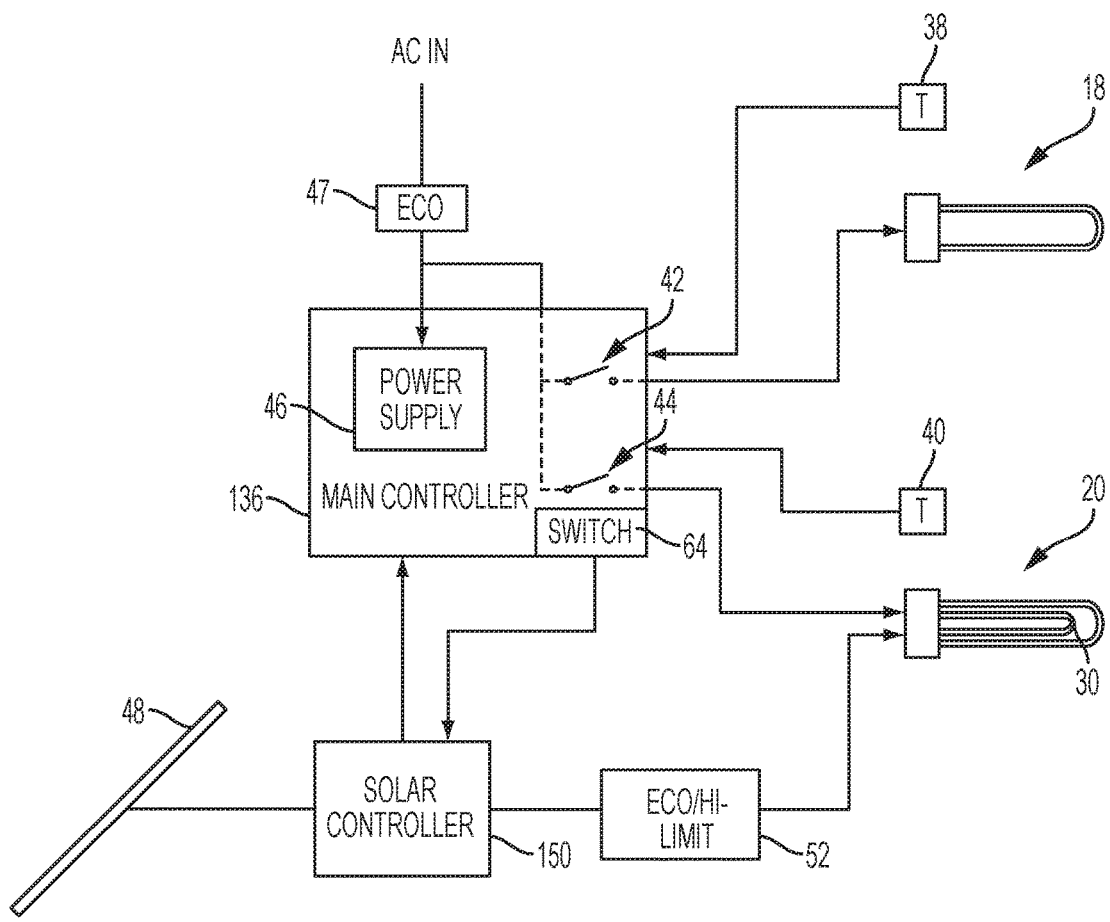
FIG. 5 is a block diagram of a heating arrangement in accordance with a second alternative embodiment of the present invention.

In this regard, FIG. 5 illustrates an alternative embodiment in which a solar controller 150 is in operative communication with a water heater controller 136. (The reference numbers for these components are increased by one hundred in comparison with their counterparts in FIG. 2 to indicate they are modified.) Controller 136 controls switches 42 and 44 for the AC resistive elements, and also controls whether solar controller 150 supplies energy for the supplemental element 30. This is diagrammatically represented by an internal "switch" 64 by which the controller 136 instructs the solar controller 150 to stop working. Thus, controller 136 functions to apply energy from the AC source and the supplemental solar source in order to enhance overall efficiency.

Figure 6:
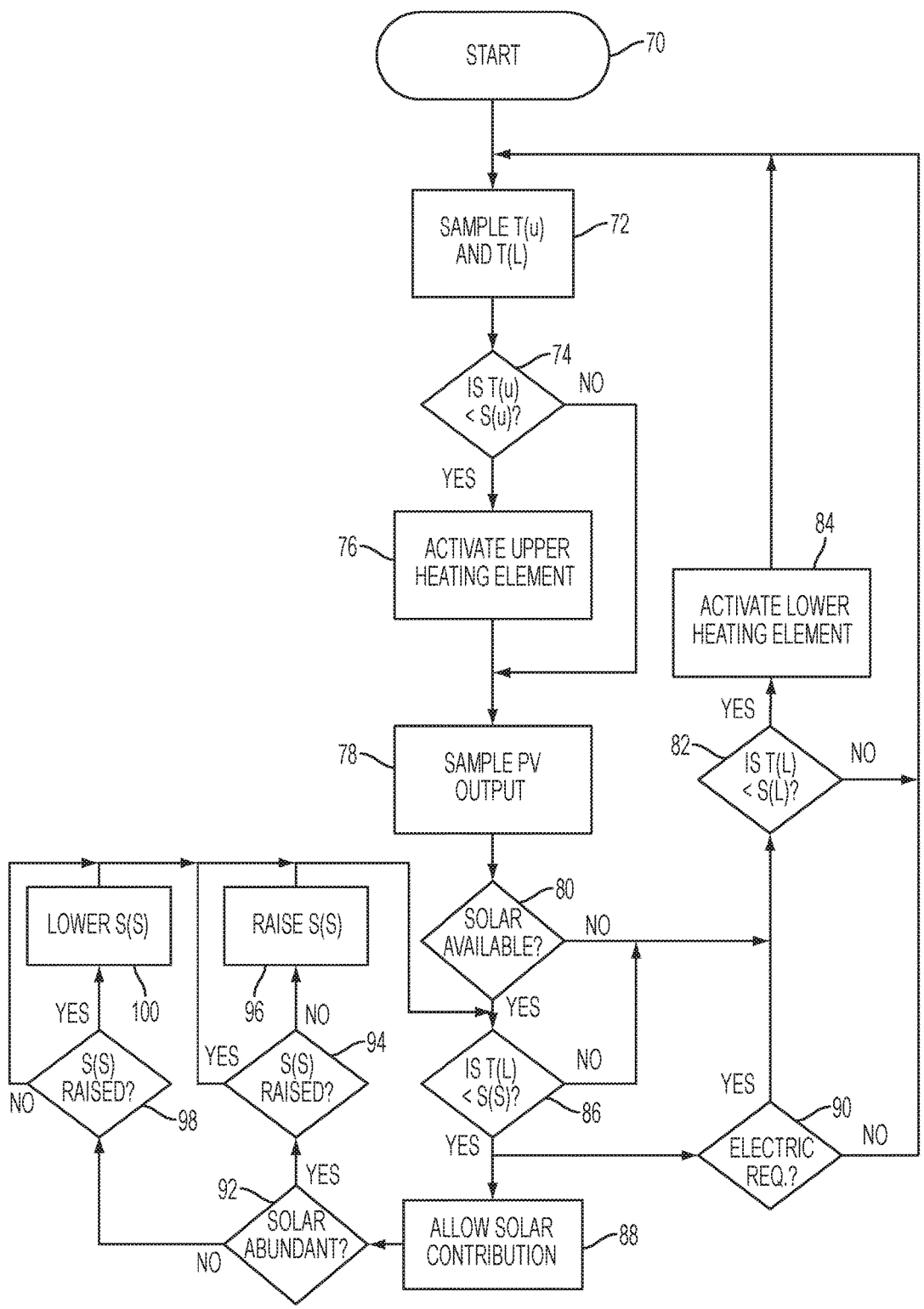
FIG. 6 is a flowchart showing an exemplary method by which the embodiment of FIG. 5 may be operated.

For example, as illustrated in FIG. 6, controller 136 may execute program instructions which dynamically change temperature set points on a temporary basis in order to take advantage of abundant solar energy when it is available. Typically, the set points will increase a moderate amount (e.g., a few degrees) in order to alleviate any concerns about the water getting too hot. For example, the upper set point may not change but the lower set point can be raised if solar energy is abundant.

According to this example, the process begins at step 70, and proceeds at step 72 to sample temperature at the top ("T(u)") and bottom ("T(L)") of the tank. At step 74, a decision is made whether T(u) is less than the upper set point "S(u)." If so, the upper heating element is activated at step 76. If not, the photovoltaic (PV) output is sampled at step 78 to determine at step 80 whether a solar contribution can be made. As should be understood in view of the present disclosure, the maximum power point tracking solar controller 150 controls the load resistance presented to photovoltaic panel 48 to draw the maximum power from panel 48 as illumination to the panel varies. Nonetheless, there will be a point at which controller 50 will not be able to provide the nominal voltage to be provided by the controller, e.g. 12 Vdc or 24 Vdc. Solar controller 150 detects and reports this condition to controller 136.

If solar contribution is not available, a determination is made at step 82 of whether T(L) is less than the lower set point S(L). If so, the lower AC element is activated at step 84. If not, the process loops back to Start. If sufficient solar energy is available, a determination is made at step 86 of whether T(L) is less than a solar set point S(S). If so, solar contribution is allowed (i.e. controller 136 controls controller 150 to apply its output voltage and current to supplemental element 30 with ECO 52) as shown at step 88. In addition, as shown at step 90, a determination is made of whether AC heating is also required because of demand or the like.

In the event that a solar contribution is allowed, a determination is made at step 92 of whether solar energy is particularly abundant at the moment. As should be understood in view of the present disclosure, solar controller 150 detects power available from panel 48 and, thus, provides information to controller 136 of the panel's ability to provide power sufficient to provide the controller's output voltage level (e.g. 12 Vdc or 24 Vdc). Accordingly, controller 136 may determine if the power available from panel 48 is sufficiently above the minimum needed to provide the desired output voltage to the supplemental element such that the solar set point should be raised. The level at which available solar power from the panel is sufficient to trigger the solar set point increase is selected at the operator's desire. If so, the process will raise the solar set point S(S) on a temporary basis to take advantage of the additional "free" energy. This is indicated at step 94, where it is determined whether the solar set point has already been raised. If not, as indicated at step 96, the set point S(S) is raised. If abundant solar energy is not available, the solar set point remains at the lower level, or is lowered back to its default value (as indicated at steps 98 and 100). It will be appreciated that set point S(S) may or may not be equal to S(L) depending on the exigencies of a particular application.

It can thus be seen that the present invention provides a water heater arrangement that exhibits improved efficiency and energy factor by the use a supplemental photovoltaic heating arrangement. While preferred embodiments of the invention have been shown and described, modifications and variations may be made thereto by those of ordinary skill in the art without departing from the spirit and scope of the present invention. For example, while the above description is primarily directed to an electric water heater having a supplemental photovoltaic heating arrangement, those skilled in the art will recognize that principles of the present invention may be used with gas water heaters as well. In addition, it should be understood that aspects of the various embodiments may be interchanged both in whole or in part. Furthermore, those of ordinary skill in the art will appreciate that the foregoing description is by way of example only, and is not intended to be limitative of the invention.

What is claimed is:

1. A water heater comprising:
    an insulated tank having a water inlet and a water outlet, said tank further defining an interior volume to contain a quantity of water;
    a primary heating arrangement disposed with respect to the tank to apply heat energy to the water to heat the water, said primary heating arrangement configured to maintain the water during standby periods between upper and lower set point temperatures;
    a supplemental heating arrangement disposed with respect to the tank to apply additional heat energy to the water to lessen energy usage by said primary heating arrangement during the standby periods, said supplemental heating arrangement including
        at least one photovoltaic panel,
        a supplemental heating element, and
        control electronics operatively interposed between said at least one photovoltaic panel and said supplemental heating element; and
    a controller in electrical communication with the primary heating arrangement and the control electronics of the supplemental heating arrangement to selectively control heating at the primary heating arrangement and the supplemental heating arrangement, wherein said controller is operative to adjust at least one of said upper and lower set point temperatures in response to changes in available energy from said at least one photovoltaic panel.

2. The water heater as set forth in claim 1, wherein said primary heating arrangement comprises at least one primary heating element adapted to be energized by AC power.

3. The water heater as set forth in claim 2, wherein said primary heating arrangement comprises first and second heating elements located near a top and a bottom of the tank, respectively.

4. The water heater as set forth in claim 3, wherein said primary heating arrangement comprises first and second thermostats associated with said first and second heating elements, respectively.

5. The water heater as set forth in claim 4, wherein said first and second thermostats comprise bi-metallic mechanical thermostats.

6. The water heater as set forth in claim 4, wherein said first and second thermostats comprise thermistors.

7. The water heater as set forth in claim 4, wherein said second heating element comprises a primary resistive element and said supplemental heating element.

8. The water heater as set forth in claim 1, wherein said controller is configured to operate said supplemental heating arrangement in response to tank conditions.

9. The water heater as set forth in claim 1, wherein said supplemental heating arrangement further comprises a high temperature limit switch operative to disconnect application of photovoltaic energy if a predetermined threshold temperature is reached.

10. The water heater as set forth in claim 1, wherein said control electronics of said supplemental heating arrangement comprise a maximum power point tracking (MPPT) controller.

11. A water heater comprising:
    a tank defining an interior volume to contain a quantity of water;
    a primary heating arrangement comprising at least one primary heating element disposed with respect to the tank to apply heat energy to the water to heat the water, said primary heating arrangement comprising at least one primary resistive element energized by AC power, said primary heating arrangement including at least one thermostat to detect temperature of the water;
    a supplemental heating arrangement operative to supply additional heat energy to the water to lessen energy usage by said primary heating arrangement, said supplemental heating arrangement including
        at least one photovoltaic panel, a supplemental heating element, and control electronics operatively interposed between said at least one photovoltaic panel and said supplemental heating element; and a controller in electrical communication with said primary heating arrangement and said control electronics of said supplemental heating arrangement to selectively control heating at said at least one primary heating element and said supplemental heating element, wherein the controller is operative to maintain said water temperature during standby periods between upper and lower set point temperatures and to raise at least the lower set point temperature in response to a level of available energy from the at least one photovoltaic panel.

12. The water heater as set forth in claim 11, wherein said control electronics of said supplemental heating arrangement are contained in a housing separate from said controller.

13. The water heater as set forth in claim 11, wherein said control electronics of said supplemental heating arrangement are integrated into said controller.

14. The water heater as set forth in claim 11, wherein said at least one primary heating element comprises first and second primary resistive elements located near a top and a bottom of the tank, respectively.

15. The water heater as set forth in claim 14, wherein said controller is operative to selectively energize said first and second primary resistive elements at respective different times.

16. The water heater as set forth in claim 15, wherein said controller is operative to selectively operate said supplemental heating arrangement during times in which said second primary resistive element is also energized.

17. A method of controlling operation of a water heater having a primary heating arrangement that is operative to apply heat energy to water contained within the water heater to maintain temperature of the water during standby periods between a predetermined upper set point temperature and a predetermined lower set point temperature, said method comprising steps of:

providing a solar heating arrangement operative to apply additional heat energy to the water to lessen energy usage by the primary heating arrangement, said solar heating arrangement including electronics operative to detect availability of solar energy;

determining whether abundance of solar energy at a particular time exceeds a threshold;

if the abundance of solar energy exceeds the threshold, raising at least the predetermined lower set point temperature; and applying heat energy from the solar heating arrangement to the water if the water temperature is between the predetermined upper set point temperature and the predetermined lower set point temperature.

18. The method as set forth in claim 17, further comprising the step of temporarily disabling the primary heating arrangement when heat energy from the solar heating arrangement is applied.

19. The method as set forth in claim 17, further comprising the step of operating the primary heating arrangement to apply heat energy to the water when the additional heat energy from the solar heating arrangement is also applied.

20. The method as set forth in claim 17, further comprising steps of:

if the abundance of solar energy does not exceed the threshold, determining whether one of the predetermined upper set point temperature and the predetermined lower set point temperature has already been raised; and if one of the predetermined upper set point temperature and the predetermined lower set point temperature has already been raised, lowering it to a default value.

21. The method as set forth in claim 17, wherein said solar heating arrangement comprises:

at least one photovoltaic panel;

a supplemental heating element; and control electronics operatively interposed between said at least one photovoltaic panel and said supplemental heating element.

22. A method of controlling operation of a water heater having a primary heating arrangement that is operative to apply heat energy to water contained within the water heater, said method comprising steps of:

providing a solar heating arrangement operative to apply additional heat energy to the water to lessen energy usage by the primary heating arrangement;

determining whether solar energy is available at a particular time;

if the additional heat energy is available, applying the additional heat energy from the solar heating arrangement to the water;

while the additional heat energy is being applied from the solar heating arrangement, selectively operating the primary heating arrangement to also supply heat energy to the water to maintain a temperature of the water between upper and lower set point temperatures; and wherein a controller is operative to adjust at least one of the upper and lower set point temperatures in response to changes in availability of said additional heat energy.

23. The method as set forth in claim 22, further comprising the step of temporarily disabling the primary heating arrangement when the additional heat energy from the solar heating arrangement is applied.

24. The method as set forth in claim 22, further comprising steps of:

if the solar energy does not exceed a threshold, determining whether one of the upper set point temperature and lower set point temperature has already been raised; and if one of the upper set point temperature and lower set point temperature has already been raised, lowering it to a default value.

25. The method as set forth in claim 22, wherein said solar heating arrangement comprises:

at least one photovoltaic panel;

a supplemental heating element; and control electronics operatively interposed between said at least one photovoltaic panel and said supplemental heating element.

* * * * *